United States Patent Office 2,919,971
Patented Jan. 5, 1960

2,919,971

DOUBLE DIFFUSION METHOD OF TREATING WOODEN COOLING TOWERS COMPRISING TREATMENT WITH HEAVY METAL SULFATE AND A WATER SOLUBLE CHROMATE

Charles E. Loetel, Overland Park, Kans., assignor to The Marley Company, Kansas City, Mo., a corporation of Delaware No Drawing. Application July 9, 1956
Serial No. 596,424

4 Claims. (Cl. 21—7)

This invention relates to cooling towers and has for its primary object the provision of a method of preserving the water saturated wooden structure contained therein subsequent to fabrication and use of the structure.

The section of heat exchanging equipment referred to as the cooling tower generally has a number of wooden components, including the water distribution system, the slatted fill or splash deck assembly, and various supporting members and side walls. In these towers water is allowed to fall downwardly within the louvered fill assembly column, and therefore, the various wooden components soon become saturated with water and subject to rapid deterioration. Because of this deterioration problem there have been many attempts to treat the wooden structure of such towers subsequent to fabrication, but because of the condition of the wood, as well as the completely inaccessible position of most of the wooden components of the tower, any attempts to preserve the wood contained therein after the tower has been placed in use, short of dismantling and treatment thereafter, have been for the most part thwarted. Manifestly, the cost factor involved in dismantling a tower, treating the wood thereof, and reassembling the same would make such a process economically impractical.

It is desirable, nevertheless, to impregnate the wood of cooling towers with relatively insoluble materials that are toxic to insects and wood destroying organisms, as well as completely fill the interstices of such wood in order to preserve the same, many materials being known and heretofore used for this purpose. However, in order to successfully preserve the wooden structure it is necessary to first obtain a substantially complete impregnation of the wood with the toxic materials, and also to use a substance that will not be easily leached out of the interstices thereof and which effectively blocks water containing deleterious organisms therein, from entering the wood. Past methods of impregnating wood have included (1) application of a solution under pressure, possibly preceded or followed by a vacuum; (2) diffusion in green wood using natural sap as the carrier; (3) soaking in a solution of the preservative; (4) a hot dip followed by a cold dip to draw the solution into the cell cavities of the wood; (5) application of a paste to dry wood and allowing it to penetrate with time; and (6) diffusing into the wood a first soluble preservative which reacts with a second preservative diffused therein to form a water insoluble precipitate therein capable of preserving the wood. It is manifest from the foregoing that only the last of these methods lends itself to the treating of water saturated wood in a cooling tower which has been in use for some time. In this respect, it is to be noted that even utilizing a process predicated upon the use of two soluble preservatives which react to form an insoluble precipitate has many problems incident thereto which must be solved in order to make the method commercially practicable as well as successful.

Therefore, it is one of the most important objects of this invention to provide a method of treating the wooden structure of a cooling tower after the tower has been placed in use and the wood has become saturated with water in which a plurality of solutions are applied to the structure and which are capable of reacting to form a water insoluble preservative within the interstices of the wood. Another important object relates to the provision of a method as above referred to which is equally applicable to small one bay cooling towers as well as multi-unit towers, fifty or sixty feet high and several hundred feet long.

Also an important object of this invention is the provision of a method of impregnating the water saturated wood of cooling towers by diffusing thereinto a wood preservative, the diffusion taking place by virtue of a difference in the solution pressure of the preservative and the water within the wood. An equally important object of this invention is to provide a method of treating such wooden structure of the cooling tower by flooding the outermost surfaces of the structure with a solution containing an active component therein for a sufficient time to substantially impregnate the wood with the component.

An important object of this invention relates to a method of treating the wooden structure of cooling towers as referred to above which includes flooding the outermost surfaces of the structure with a first solution containing a wood preservative until the structure is substantially impregnated therewith, then flooding the outermost surfaces with a second solution containing a wood preservative until the structure is substantially impregnated with the preservative of the second solution, the preservatives in the first and second solutions being capable of reacting to form a water insoluble precipitate within the wood, and then neutralizing the unreacted portion of the preservative in the second solution by adding thereto an agent capable of reacting with the preservative in the second solution to form a non-corrosive water insoluble precipitate in the wood.

Also an important object of this invention is to provide a method of treating the wooden structure of cooling towers wherein a plurality of solutions each including a wood preservative are successively applied to the structure in a manner whereby each is flooded over the outermost surfaces of the wooden structure, allowed to gravitate into a collecting basin beneath the structure, recirculated to the uppermost end of the tower and again flooded over the outermost surfaces of the structure, such recirculation and reflooding being continued until the structure is substantially impregnated with the preservatives in each of the solutions respectively.

Other important objects of the instant invention relate to the provision of a method of preserving cooling towers as hereinabove set forth, wherein the solution containing the wood preservative may be delivered to the wooden distribution deck above the structure and allowed to gravitate therefrom over the outermost surfaces of the fill assembly into the cold water catch basin therebelow and then recirculated to the distribution deck to again gravitate over the fill assembly, whereby the degree of impregnation of the wooden structure may be controlled by the relative concentration of preservative in the solution and the number of times the solution is allowed to gravitate through the structure; to a method of treating cooling towers wherein the solution containing the wood preservative may be directed onto the wooden structure of such towers in a stream under pressure, whereby all the wooden components of the structure may be subjected to the preservative by diverting the direction of the stream; to the method of treating the wooden structure of cooling towers in which all of the unreacted active components of the solutions applied to the structure are precipitated either into the wood or in the catch basin under the tower to effectively preclude entry of such preservatives into the circulating system of the cooling tower when such tower is again placed in use after the treatment process; to the provision of a method of treating cooling towers wherein it is desired to treat a multi-bay tower without completely closing down the tower and prevent use of the same during the treating operation, the method being applicable in such a manner that one bay of the tower may be treated while the remaining ones continue in operable condition, then subsequently putting the treated bay back in operation while the untreated bays are subjected to the process.

Broadly, the process of the instant invention is carried out by applying to the outermost surfaces of the wood in a cooling tower that has been in use and thus is saturated with water, a first solution containing a wood preservative until the structure becomes substantially impregnated therewith, removing the solution and undiffused preservative therein from the catch basin disposed beneath the tower, then applying to the outermost surfaces of the structure a second solution containing a wood preservative until the structure becomes substantially impregnated with the second solution, the wood preservative in the second solution being capable of reacting with the wood preservative contained in the first solution to form a water insoluble, toxic precipitate in the wood capable of destroying all organisms therein, and subsequently subjecting the second solution remaining in the wood, on the outermost surfaces thereof, and in the catch basin to an agent capable of reacting with any unreacted portions of the wood preservative contained in the second solution to form a water insoluble precipitate, either within the wood, on the outermost surface thereof, or in the catch basin.

Although not necessary, it is to be preferred that the second solution have a sufficient quantity of wood preservative therein in excess of that necessary to precipitate the wood preservative in the first solution to assure complete precipitation of the preservative in the first solution. By the same token an excess of the agent for precipitating the unreacted portion of the wood preservative in the second solution should be added in order to completely precipitate such unreacted portion of the second solution.

In order to obtain the highest diffusion rate possible it is preferable to utilize solutions substantially saturated with a wood preservative but in many instances it is desirable and even necessary, in order to have the fastest diffusion rate possible, to prepare a slurry in which the quantity of wood preservative added to the solvent is in excess of the solubility product thereof in order to produce an undissolved proportion which dissolves into the solvent as the solvated proportion diffuses into the water within the wood.

Substantially complete impregnation of the water saturated wood, when a slurry of the wood preservative is applied thereto, is accomplished by virtue of the variation in solution pressure between the preservative and the water within the wood. The dissolving of a solid in a liquid involves several factors. In ideal solutions the molecules break away from the crystal and fill the volume of the solvent until the solution is saturated, the factors affecting the solubility of a solid in a liquid being concentration, temperature and pressure. The method of this invention takes advantage of the concentration factor, as it would be completely impractical as well as economically infeasible to vary the temperature or pressure of the solution to be used to impregnate a cooling tower subsequent to use. In a homogeneous solution the system is in equilibrium and a sample from any portion thereof will be identical with any other portion. But, when a heterogeneous solution is present a sample from one portion will not be identical with the other. However, if the portions of the heterogeneous solution are miscible with each other, then diffusion of one portion into the other takes place because of the solution pressure of the portions having the higher concentration, eventually an equilibrium being established in which the solution will become substantially homogeneous throughout. The rate at which this diffusion takes place will vary with the concentration increment between the various portions. Therefore, in the present invention when a solution of a wood preservative having a higher solution pressure than the water within the wood is applied to the outermost surfaces of that wood, diffusion takes place as the equilibrium is established and the wood becomes substantially impregnated with the preservative. Thus when a solution is employed having a concentration of wood preservative in excess of the solubility product thereof, the solution pressure of such solution remains constant while the diffusion is taking place by virtue of the continued dissolving of the solid material into the water as the solutions approach the equilibrium.

As heretofore pointed out, the impregnation can be carried out by the use of various suitable materials which will diffuse into the wood and therein react with each other to form an insoluble precipitate within the wood. The only requisites of a two component system as outlined above are that the wood preservatives employed be within economical limits, they should ordinarily be soluble in water, and form a precipitate within the wood which is water insoluble. Examples of water soluble materials which will react to form preservatives within the wood are the following:

Example 1:
    First component—Copper sulphate
    Second component—Sodium chromate Example 2:
    First component—
        Copper sulphate
        Arsenic acid
    Second component—Sodium chromate Example 3:
    First component—
        Copper sulphate
        Arsenic acid
    Second component—
        Sodium chromate
        Sodium fluoride Example 4:
    First component—
        Zinc sulphate
        Arsenic acid
    Second component—Sodium chromate Example 5:
    First component—Copper sulphate
    Second component—Sodium phosphate Example 6:
    First component—Copper sulphate
    Second component—
        Sodium borate
        Boric acid Example 7:
    First component—Sodium pentachlorophenate
    Second component—Copper sulphate As above noted, the proportions of the chemicals are varied to produce on reaction the desired end product, although it is usually desirable to use a slight excess of the materials in descending order to assure complete reaction of the preservative contained in the solution applied next therebefore. Since these materials react when they come into contact with one another it is necessary to impregnate the wood with first one and then with the other, but it makes no difference in which order the two components are diffused into the wood, the same reaction resulting irrespective of the order of application. Of importance is the fact that detergents may or may not be used with the preservative to obtain spreading, thixothropic gels that become fluid upon agitation also being added if desired.

Although the solutions containing a wood preservative may be applied to the structure in various manners, the procedure hereinafter set forth has been found to be the most successful and economical. For a complete understanding of the instant invention as to the type of cooling tower structures which are to be treated, reference is herein made to U.S. Letters Patent Reissue 21,794 of Leon T. Mart and entitled "Cooling Tower." In this type of cooling tower, which is known in the trade as a "cross-flow" tower, there is provided a pair of fill assemblies disposed on opposite sides of an air discharge chamber which has a discharge fan at the uppermost end thereof, and wherein there is provided a cold water basin underlying the entire cooling tower structure, and a hot water distribution basin overlying the uppermost end of each fill assembly respectively. The blower at the uppermost end of the discharge chamber pulls air in from the opposite sides of the cooling tower and pulls the same across the fill assemblies perpendicular to the path of travel of water gravitating from the hot water distribution deck to the cold water basin, and eventually discharges the same through the outlet opening.

It can be readily appreciated that a plurality of these cooling tower units generally referred to as multi-cell cooling towers can be disposed adjacent each other and operated either simultaneously or independently of each other. Of extreme importance in the treatment of the wood forming a part of such structure is the difficulty of treating the wooden components thereof subsequent to fabrication and use of the tower, inasmuch as many of these cooling units are of tremendous size and take a considerable length of time to fabricate.

It is manifest that in towers which may be some fifty to sixty feet high and several hundred feet in length, it would be completely impractical to dismantle the same, treat the component parts thereof with a wood preservative, and subsequently reconstruct the entire tower, merely for the purpose of preserving the wooden structure contained therein. However, because there is a large investment in towers of this type, it is of prime importance that the wooden components thereof last as long as practicable and in this respect, treating of such wooden parts with a wood preservative is of extreme importance in order to prolong the overall life expectancy of the cooling unit by preventing deterioration of the wood therein. Another important consideration is the fact that since these towers are universally used in the steel industry, petrochemical plants, petroleum refineries, chemical plants and pipeline pumping stations, it is manifest that the units cannot be closed down and the treatment process carried out without closing down many of the vital operations of the industry itself. Therefore, in order to present a method of treating the wood in such structures without the necessity of closing down the entire operation of the plant wherein the cooling tower is bieng used, it is necessary that only one cell of the multicell unit be treated at a time so that the unit can be kept in operation.

The method of the instant invention is singularly adapted for such treatment and the preferred process is to prepare a first impregnating solution by dissolving therein a water soluble wood preservative. Although many wood preservatives would meet the requisite specifications, a number of which have been set forth in the examples above, for purposes of illustration only certain ones of the above operable preservatives will be described in conjunction with the hereinafter set forth process. Thus a first solution substantially saturated with copper sulphate may be prepared in a tank truck or the like having a pump circulating system, such system being adapted to direct the solution containing the copper sulphate therein to the uppermost end of the cooling tower where it may be delivered directly into the wooden water distribution deck. From the distribution deck the impregnating solution may gravitate through the spray nozzles thereof onto the uppermost slats of the fill assembly where the solution completely floods the outermost surface of such slats in the fill assembly and gravitates downwardly into the cold water basin disposed beneath the cooling tower. It can be appreciated that as the solution gravitates downwardly through the fill assembly, because of the difference in solution pressure between the solution containing the wood preservative and the water within the saturated structure of the cooling tower, a certain amount of the wood preservative in the solution diffuses into the wood. The amount of such diffusion will vary, of course, with the concentration of the impregnating solution as well as the actual time to which the outermost surfaces of the wooden structure are subjected to the solution. Although a certain amount of the wood preservative in the solution will diffuse into the wooden structure during one cycle of subjecting the wooden components to a designated amount of solution, the most practical treating process consists of collecting the excess solution in the cold water basin below the tower, utilizing the pumping system of the tank truck to recirculate the solution to the uppermost end of the cooling tower where it is delivered to the distribution deck and allowed to again regravitate to the lowermost end of the tower. Such recirculation and reflooding of the outermost surfaces of the cooling tower can be continued until the requisite amount of wood preservative, in this instance copper sulphate, has diffused into and substantially impregnated all of the wooden structure of the cooling tower to which the solution is directed.

After the required amount of copper sulphate has been diffused into the wood, all of the remaining solution containing the copper sulphate is allowed to collect in the cold water basin where it is again pumped to the tank truck. This solution may then be pumped out of the truck to a suitable place of storage after which a second solution is prepared in the truck or other suitable container by dissolving in a quantity of water an amount of sodium chromate in excess of what is necessary to precipitate all of the copper sulphate contained within the wooden structure of the cooling tower as the toxic water insoluble wood preservative, copper chromate. For example only and not as a limitation thereof, it has been found that a concentration of 10% more sodium chromate than is necessary to react with the copper sulphate contained in the wood of the cooling tower, assures complete precipitation thereof.

This solution containing sodium chromate is then pumped by virtue of the pump system of the tank truck into the distribution deck of the cooling tower, where it is allowed to gravitate through and flood the outermost surfaces of all of the wooden components of the fill assembly. Inasmuch as this diffusion process is substantially similar to that described above with reference to copper sulphate, the operation will not be described further, other than to note that the sodium chromate solution is recirculated and flooded over the cooling tower wooden structure until all of the copper sulphate has been precipitated as copper chromate.

It can be recognized that inasmuch as the sodium chromate also diffuses into the wood by virtue of the difference in solution pressure between the sodium chromate solution and the water within the wood, the sodium chromate initially diffuses into the wood and then reacts with the copper sulphate to precipitate insoluble toxic copper chromate.

After the sodium chromate has completely precipitated all of the copper sulphate, although the sodium chromate solution collected in the bottom of the tower in the cold water basin could be pumped off and disposed of as was the copper sulphate, it has been found desirable to, in effect, neutralize the sodium chromate rather than dispose of the same. The reason for this is predicated principally upon the fact that even though the sodium chromate solution disposed within the cold water basin could be pumped out of the basin and thus preclude entry of the treating solution into the circulation system of the cooling tower, it is obvious that there is a certain amount of unreacted sodium chromate solution remaining on the outermost surfaces of the wooden structure of the cooling tower as well as the excess within the wooden structure, which remained after all of the copper sulphate had been precipitated. Therefore, when the cell was again placed in operation, even though the sodium chromate solution in the cold water basin had been removed, the sodium chromate contained on and within the wooden structure would pass into the circulating system.

Allowing entry of sodium chromate into the circulating water of the cooling tower must be prevented for various reasons, the most important of which include the fact that during operation of the tower, a stipulated quantum of the water must always be allowed to overflow and pass through the "blowdown" system into the sewer. Many governmental regulations make illegal the disposal of chromate compounds into sewage lines because of the toxicity of such compounds to animal life, and also because of the yellow deposits left remaining on the banks of the streams. Other important reasons why chromate compounds should not be allowed to circulate in the water system of the cooling tower is the fact that many personnel of the plant are allergic to chromates and further, because of the fact that the soluble chromate therein causes the circulating system to be yellow in color which in many industries, such as paper and cloth, may eventually work its way into the manufacturing process in a manner to actually color the paper or cloth yellow. This can develop either because of leakage around fittings or the like or even overflowing of the circulating water.

Although somewhat anomalous, another factor which must be overcome relates to the problem that many purchasers of the cooling tower believe that the yellow chromate compounds have a deleterious affect on the operating system of the tower. Although in actuality this is not true, since sodium chromate, for example, would actually have a beneficial affect on the system, in order to completely allay the apprehensions of these purchasers, it is requisite that the yellow color imparted to the circulating system be removed.

The most economically feasible method of removing the sodium chromate from the circulating system of the cooling tower is to add a sufficient quantity of an agent capable of reacting with the sodium chromate to form a non-corrosive, insoluble precipitate thereof. It is manifest that many compounds would meet these requirements, but for economic considerations it has been found that zinc sulphate is preferable. Since it is desired to neutralize all of the soluble sodium chromate contained in the solution remaining in the cold water basin of the tower as well as that disposed within the wood and on the outermost surfaces thereof, the most advantageous process is to add a sufficient quantity of powdered zinc sulphate to the cold water basin containing the sodium chromate solution to precipitate all of the sodium chromate within the basin and that contained within the wood and on the outermost surfaces thereof. The pumping system of the tank truck should again be utilized to pump the solution containing the zinc sulphate to the uppermost end of the tower thereby delivering the same to the hot water distribution deck for gravitation through the fill assembly. From the foregoing it is apparent that such recirculation and reflooding with the zinc sulphate solution should be continued until all of the sodium chromate has been precipitated as zinc chromate. Also it is desirable to add an excess of zinc sulphate to insure complete precipitation of the sodium chromate whereby all of the yellow color imparted thereby to the circulating system is removed. The zinc sulphate solution passing from the distribution deck through the fill assembly also diffuses into the wooden structure thereof because of the difference in solution pressure and therefore, precipitates the insoluble zinc chromate in the wood itself as well as on the outermost surfaces thereof. Therefore, the insoluble zinc chromate adds to the wood preserving character of the treatment process and serves the dual function of providing added preservative as well as removing all of the sodium chromate.

Inasmuch as the multi-cell cooling towers have a cold water basin disposed under each cell respectively, it can be seen that each individual cell may be treated independently of the remaining cells while such cells are maintained in operation. Because of the fact that in constructing these multi-cell cooling units a great deal of supporting structure must also be provided, it is usually desirable for the operator carrying out the treating process to manipulate the end of the hose normally directing solution into the hot water distribution deck in a manner to completely flood all of the parts not subjected to the solution by normal gravitation of the same from the hot water distribution deck by directing the solution emanating under pressure from the hose onto the various component parts. Because of the fact that these huge cooling tower units actually have access doors at the lowermost ends thereof, the operator may proceed through such doors into the interior of the structure and direct the liquid solution from the hose onto the various component parts as he pleases for a time sufficient to impregnate the usually inaccessible parts with the preservative. It can be recognized that the solution flooded onto the wooden parts also gravitates to the cold water basin disposed beneath the structure where it is available for recirculation.

The term "substantially impregnated with the wood preservative" as used herein does not mean completely impregnated, as such complete impregnation would not be economically or practically feasible but is utilized in the sense substantially impregnating wood from face to face as opposed to merely placing a surface coating thereon. In other words, the term does not mean completely saturating all of the water within the wood with a particular wood preservative but means impregnating the wood with a substantial proportion of active component. By the same token it should be pointed out that the proportions of wood preservatives utilized in the instant invention are not in any manner critical but depend for the most part on the extent to which it is desired that the wood be impregnated. The more concentrated the solution containing a wood preservative and the longer period of time such solution is flooded over the wooden structure of the cooling tower, the greater the impregnation of the wood as well as the higher concentration of preservative within the wood.

Because of the fact that most water systems supply water to a point of use containing a quantity of alkaline material such as calcium carbonate or magnesium carbonate, the water has a pH in excess of 7.0 and therefore, tends to make the water contained within the wood of the cooling water slightly alkaline also. If this is the case, a sufficient quantity of sodium bisulphate or sulphuric acid should be added to the initial solution passed over the tower to render the pH of the solution at approximately 6.0. This prevents precipitation of copper hydroxide, for example, if copper sulphate is being utilized as the first impregnating component.

If such acidifying process must be carried out, then either before or after the zinc sulphate is added to neutralize the sodium chromate, the solution containing such zinc sulphate and sodium chromate should be adjusted to an alkaline pH in excess of 7.0 by addition of sodium carbonate or the like, in order to cause precipitation of the insoluble zinc chromate.

Since the zinc chromate is insoluble and gravitates to the bottom of the cold water basin, and inasmuch as the water of the circulating system ordinarily overflows a discharge pipe, it is manifest that the operation of the tower can be continued with such insoluble chromate remaining on the bottom of the basin where it will not cause any difficulties in the operation thereof. When the individual cell of the tower is next closed down for the ordinary cleaning operation, such precipitated chromate compound may be removed along with the other sludge therein by the usual procedures. Thus, operation of the cooling tower is not precluded in any manner and interference with any industrial processes is effectively prevented.

One of the principal features of the instant process is the fact that inexpensive, readily obtainable products on the open market may be employed to treat the wood, a method now being presented in which any material having wood preserving properties and soluble in water or any other suitable solvent, may be employed to impregnate the water saturated wood of the cooling tower without the necessity of tearing down and dismantling the tower in order to treat the wood therein. Although the method of the present invention is directed toward treatment of water saturated structure in a cooling tower, it is manifest that it could also be applied to any wood which has become completely saturated with water. If feasible, the wood, if not already saturated with water, may be saturated and the present process carried out.

Having thus described the invention what is claimed as new and desired to be secured by Letters Patent is:

1. In a method of treating the wooden structure of cooling towers by impregnation with a wood preservative subsequent to fabrication thereof and after the wooden structure has become completely saturated with water, the improved steps of applying a first solution containing a high concentration of a metallic compound selected from the group consisting of copper sulfate and zinc sulfate, to said wooden structure of the tower; maintaining said first solution in contact with said wooden structure until the latter is impregnated with a calculated amount of said compound per unit volume of the structure; then applying a second solution containing a water soluble chromate compound, to said structure, the quantity of chromate in said second solution being in excess of the stoichiometric amount required to effect precipitation of a water insoluble chromate in said wooden structure; maintaining said second solution in contact with said wooden structure until substantially all of the metallic compound within the wooden structure from said first solution has reacted with said water soluble chromate to form said water insoluble chromate within the wood; next applying a third solution containing zinc sulfate to said wooden structure; and maintaining said third solution in contact with said wooden structure until all of the excess, unreacted water soluble chromate in and on the wooden structure has reacted with said zinc sulfate.

2. A method as set forth in claim 1 wherein said excess of water soluble chromate in said second solution is at least about 10%.

3. A method as set forth in claim 1 wherein the water in and on said wooden structure is maintained at a pH below 7.0 during application of said first and second solutions thereto.

4. A method as set forth in claim 1 wherein a sufficient quantity of sodium carbonate is added to said last solution to adjust the pH thereof to above 7.0.

References Cited in the file of this patent

UNITED STATES PATENTS

| | | |
|---|---|---|
| Re. 21,794 | Mart | May 6, 1941 |
| 2,284,889 | Fisher | June 2, 1942 |
| 2,408,978 | Hager | Oct. 8, 1946 |
| 2,432,007 | Hager | Dec. 2, 1947 |
| 2,895,848 | Baker | July 21, 1959 |

OTHER REFERENCES

Baechler: Applied Microbiology, September 1956, pp. 229–236, sub. for pub., March 23, 1956, copy of speech presented September 7, 1955.

Weiss: Preservation of Structural Timber, 1916, pp. 48 and 49.